(12) United States Patent
Nakamura et al.

(10) Patent No.: US 9,367,485 B2
(45) Date of Patent: Jun. 14, 2016

(54) STORAGE DEVICE, DATA PROCESSING DEVICE, REGISTRATION METHOD, AND RECORDING MEDIUM

(71) Applicant: Fujitsu Limited, Kanagawa (JP)

(72) Inventors: Yosuke Nakamura, Kawasaki (JP);
Kazuaki Nimura, Kawasaki (JP);
Koichi Yasaki, Kawasaki (JP);
Zhaogong Guo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/246,528

(22) Filed: Apr. 7, 2014

(65) Prior Publication Data
US 2014/0258665 A1 Sep. 11, 2014

Related U.S. Application Data

(62) Division of application No. 13/035,387, filed on Feb. 25, 2011, now Pat. No. 8,713,250.

(30) Foreign Application Priority Data

Mar. 30, 2010 (JP) ................. 2010-079051

(51) Int. Cl.
*G06F 12/14* (2006.01)
*G06F 21/78* (2013.01)

(52) U.S. Cl.
CPC ............ *G06F 12/1458* (2013.01); *G06F 21/78* (2013.01); *G06F 2212/1052* (2013.01)

(58) Field of Classification Search
CPC ........................................ G06F 21/78
USPC ........................................ 711/163
See application file for complete search history.

(56) References Cited

U.S. PATENT DOCUMENTS 5,146,499 A * 9/1992 Geffrotin ............... G06F 21/34
235/380
6,477,530 B1 11/2002 Omata et al.
(Continued)

FOREIGN PATENT DOCUMENTS

GB  2 384 885  8/2003
JP  7-114501  5/1995
(Continued)

OTHER PUBLICATIONS

Trusted Computing Group. "TCG Storage Security System Class: Opal." TCG Storage Opal SSC Specification, Ver. 1.00, Rev. 3.00, revised Dec. 19, 2009, published Feb. 4, 2010.*
(Continued)

*Primary Examiner* — Kevin Verbrugge
*Assistant Examiner* — Zubair Ahmed
(74) *Attorney, Agent, or Firm* — Staas & Halsey LLP (57) ABSTRACT

A storage device includes a switching unit which switches an access destination in a storage area between a first storage area and a second storage area in response to an access request from a host device; and a nonvolatile storage medium which stores a first host device information used to identify the host device in the second storage area, and a software module executed by a CPU provided in the host device, the software module comprising causing an authority grant unit which transmits a control signal for switching the access destination to the first storage area to the switching unit of the storage device, when the acquired first and second host device information are compared to find that the first and second host device information match with each other.

7 Claims, 8 Drawing Sheets

(56) References Cited

U.S. PATENT DOCUMENTS

| | | | |
|---|---|---|---|
| 6,961,567 B1* | 11/2005 | Kuhn | H04W 8/04 379/121.06 |
| 2003/0014600 A1 | 1/2003 | Ito et al. | |
| 2003/0109938 A1* | 6/2003 | Daum et al. | 700/11 |
| 2003/0167393 A1 | 9/2003 | Yoshida | |
| 2004/0015570 A1* | 1/2004 | Daum et al. | 709/220 |
| 2004/0057069 A1 | 3/2004 | Ikeda | |
| 2004/0162932 A1 | 8/2004 | Mizushima et al. | |
| 2005/0097338 A1 | 5/2005 | Lee | |
| 2006/0259828 A1* | 11/2006 | Swoboda | 714/38 |
| 2006/0289659 A1 | 12/2006 | Mizushima | |
| 2007/0113079 A1* | 5/2007 | Ito | G06F 9/468 713/166 |
| 2007/0214309 A1 | 9/2007 | Matsuura et al. | |
| 2008/0140972 A1 | 6/2008 | Kim | |
| 2008/0282345 A1* | 11/2008 | Beals | 726/21 |
| 2009/0144730 A1* | 6/2009 | Chen et al. | 717/178 |
| 2010/0250887 A1 | 9/2010 | Stafford et al. | |
| 2011/0087748 A1* | 4/2011 | Nimura et al. | 709/206 |
| 2011/0088084 A1* | 4/2011 | Yasaki et al. | 726/5 |
| 2011/0213899 A1* | 9/2011 | Guo et al. | 710/7 |

FOREIGN PATENT DOCUMENTS

| | | |
|---|---|---|
| JP | 7-287655 | 10/1995 |
| JP | 8-6729 | 1/1996 |
| JP | 2000-47896 | 2/2000 |
| JP | 2004-192191 | 7/2004 |
| JP | 2005-169862 | 6/2005 |
| JP | 2005-209302 | 8/2005 |
| JP | 2007-272282 | 10/2007 |
| JP | 2007-316968 | 12/2007 |
| JP | 2008-129744 | 6/2008 |
| JP | 2009-76045 | 4/2009 |
| JP | 2009-258979 | 11/2009 |
| WO | 2009/088279 | 7/2009 |
| WO | 2010/030157 | 3/2010 |

OTHER PUBLICATIONS

Trusted Computing Group, "TCG Storage Security System Class: Opal", TCG Storage Opal SSC Specification, Specification Version 1.0, Revision 1.0, Jan. 27, 2009.*

Kazuaki Nimura et al., "Enhancement of hard drive authentication that enables self-wipe", IPSJ Symposium Series, vol. 2009, No. 11, Oct. 29, 2009, pp. 355-360.

Fujitsu Ltd. et al., "World's First! Development of a Technique which Prevents Information Leakage due to Extraction of a Hardware Drive", Press Release (online), URL:http://pr.fujitsu.com/jp/news/2009/10/19.html, Oct. 19, 2009, pp. 1-2.

Trusted Computing Group. "TCG Storage Security System Class: Opal." TCG Storage Opal SSC Specification, Ver. 1.00, Ref. 3.00, revised Dec. 19, 2009, published Feb. 4, 2010.

Office Action mailed Mar. 21, 2013 in corresponding U.S. Appl. No. 13/035,387.

Final Office Action mailed Sep. 3, 2013 in corresponding U.S. Appl. No. 13/035,387.

Notice of Allowance mailed Dec. 13, 2013 in corresponding U.S. Appl. No. 13/035,387.

U.S. Appl. No. 13/035,387, filed Feb. 25, 2011, Yusuke Nakamara, et al., Fujitsu Limited.

* cited by examiner

STORAGE DEVICE, DATA PROCESSING DEVICE, REGISTRATION METHOD, AND RECORDING MEDIUM

CROSS-REFERENCE TO RELATED APPLICATIONS

This application is a divisional of U.S. Ser. No. 13/035,387, filed Feb. 25, 2011, which is based upon and claims the benefit of priority of the prior Japanese Patent Application No. 2010-79051 filed on Mar. 30, 2010, the entire contents of which are incorporated herein by reference.

FIELD

The present application relates to a storage device, a data processing device, a registration method, and a recording medium that prevent data leakage.

BACKGROUND

As one of technologies for preventing leakage of information stored in a personal computer (PC), for example, there is known a technology for preventing, when a PC is stolen, information leakage from the stolen PC by erasing an encryption key of an encrypted hard disk drive (HDD) provided in the PC by an instruction from remote. That is, by erasing the encryption key, it becomes impossible to decrypt encrypted information in the HDD so that the information leakage may be prevented.

However, in the above-described technology, since the encryption key may not be erased when the HDD is detached from the PC before the instruction from remote is received, there is a possibility that the encrypted information in the HDD is decrypted by using other PCs.

As a technology capable of solving such problem, for example, as described in Japanese Laid-open Patent Publication No. 2009-258979, there is a HDD including a self-erasing function in which a disk erasing program and a circuit for executing the erasing program are mounted and, when configuration between a BIOS and the HDD fails, the erasing program is executed to erase information in the HDD.

With this technology, for example, after the HDD is detached from the PC, when trying to connect the HDD to another PC to view the information in the HDD, the information in the HDD is erased at the point when the HDD is connected to another PC to be activated.

However, since the above-described HDD including the self-erasing function may be required modification of hardware, the HDD includes a problem that it is difficult for companies that develop anti-theft technologies for PCs to incorporate the anti-theft technologies in existing HDDs.

SUMMARY

A storage device disclosed in the present application includes a switching unit which switches an access destination in a storage area between a first storage area and a second storage area in response to an access request from a host device; and a nonvolatile storage medium which stores a first host device information used to identify the host device in the second storage area, and a software module executed by a CPU provided in the host device, the software module comprising: causing the host device to function as a first host device information acquisition unit which acquires the first host device information stored in the second storage area, causing the host device to function as a second host device information acquisition unit which acquires a second host device information used to identify the host device from a nonvolatile storage medium stored by the host device that is different from the storage device, and causing an authority grant unit which transmits a control signal for switching the access destination to the first storage area to the switching unit of the storage device, when the acquired first and second host device information are compared to find that the first and second host device information match with each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The present invention will be specifically described hereinbelow on the basis of the drawings illustrating embodiments thereof.

First Embodiment

Figure 1:
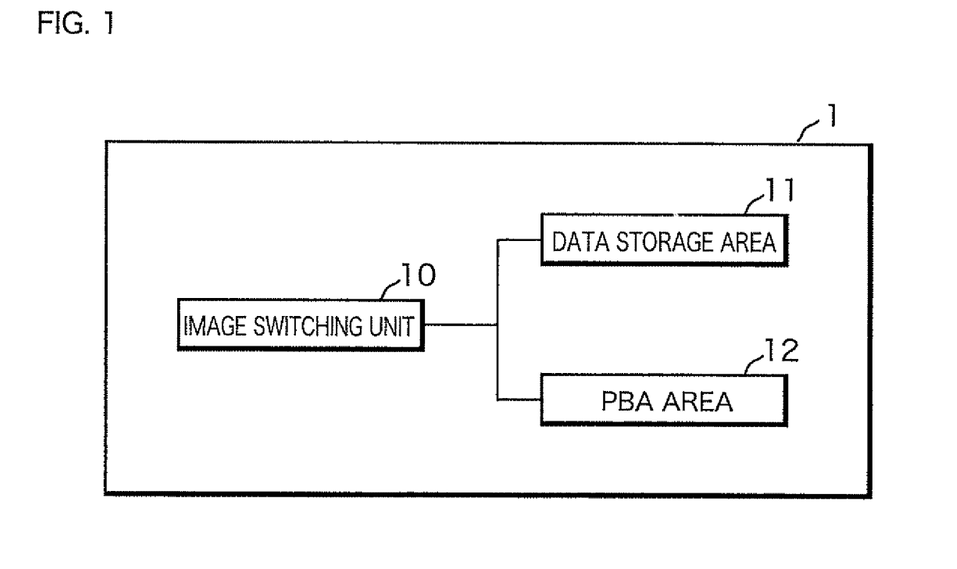
FIG. 1 is a schematic view illustrating a schematic structure of a storage device according to the present embodiment.

FIG. 1 is a schematic view illustrating a schematic structure of a storage device according to the present embodiment. A storage device 1 according to the present embodiment is a storage device in conformity with TCG Opal SSC specifications (Trusted Computing Group Opal Security Subsystem Class) standardized by TCG (Trusted Computing Group). Specifically, the storage device 1 according to the present embodiment is a storage device such as a HDD (Hard Disk Drive), a SSD (Solid State Drive), or the like.

A conventional HDD (a HDD that is not in conformity with TCG Opal SSC specifications) is capable of including only one image that may be activated in a storage area, but a storage device in conformity with TCG Opal SSC specifications (hereinafter referred to as a TCG-HDD) is capable of including two images. One is in a data storage area 11 where user's data is stored, and the other one is in a PBA area 12 (PBA: PreBoot Authentication) that includes an authentication function, and is generated for the purpose of carrying out authentication before boot-up of a PC.

The storage device 1 according to the present embodiment includes the above-mentioned data storage area 11 and PBA area 12, and includes an image switching unit 10 for switching the storage area to be used on boot-up.

The image switching unit 10 performs image load control and access control of the data storage area 11 and the PBA area 12. In the data storage area 11, there are stored an OS (Operating System) booted by a PC 2 as a connection destination (see FIG. 2), data created by a user of the PC 2, and the like. In the PBA area 12, the OS image may also be stored similarly to the storage area, and the capacity of 128 Mbytes is secured.

As operational modes of the TCG-HDD, there are two types of an ATA mode and a TCG mode. In the ATA mode, the HDD may be controlled from the outside (BIOS and OS) by using the same ATA command as that for the conventional HDD, and the same usage as that for the conventional HDD may be adopted. However, the image switching or the preboot authentication (PBA) that characterize the TCG-HDD do not function.

On the other hand, in the TCG mode, the HDD is controlled by using a TCG command that is different from the conventional command. In addition, in the TCG mode as well, it is possible to set use/non-use of the PBA area 12 and, when the PBA area 12 is not used, the OS image in the data storage area 11 is activated similarly to the conventional HDD.

The storage device 1 according to the present embodiment is constituted such that the image switching unit 10 and the PBA area 12 function by adopting a setting in which the TCG mode and the PBA area 12 are used. In the conventional HDD, a MBR (Master Boot Record) is provided at the head portion of the storage area and, when the control is shifted from the BIOS to the HDD, the MBR is firstly read. In the TCG-HDD as well, a Shadow-MBR is provided in the PBA area 12.

In a case where the control is shifted to the image switching unit 10 from the BIOS, when the preboot authentication (PBA) is used, the image switching unit 10 loads the image in the PBA area 12 in order to read the Shadow-MBR. When the image is switched from the image in the PBA area 12 to the image in the data storage area 11, a program stored in the PBA area 12 performs the control. A CPU (not illustrated) in the PC 2 executes a "MBR-DONE" command as the TCG command, and the image switching unit 10 thereby loads the image in the data storage area 11 to switch the OS image.

As will be described later, when a PC as a connection destination is not authenticated, the storage device 1 erases data stored in the data storage area 11. The erasing of data may be implemented by directly overwriting the data by 0.

In addition, since the TCG-HDD includes an encryption function using hardware, the erasing of the data may also be implemented by re-generating an encryption key instead of the erasing by directly overwriting the data. Specifically, a "GenKey" command as the TCG command is used. The "GenKey" command is an erasing command corresponding to "Security Erase Unit" as the ATA command.

Figure 2:
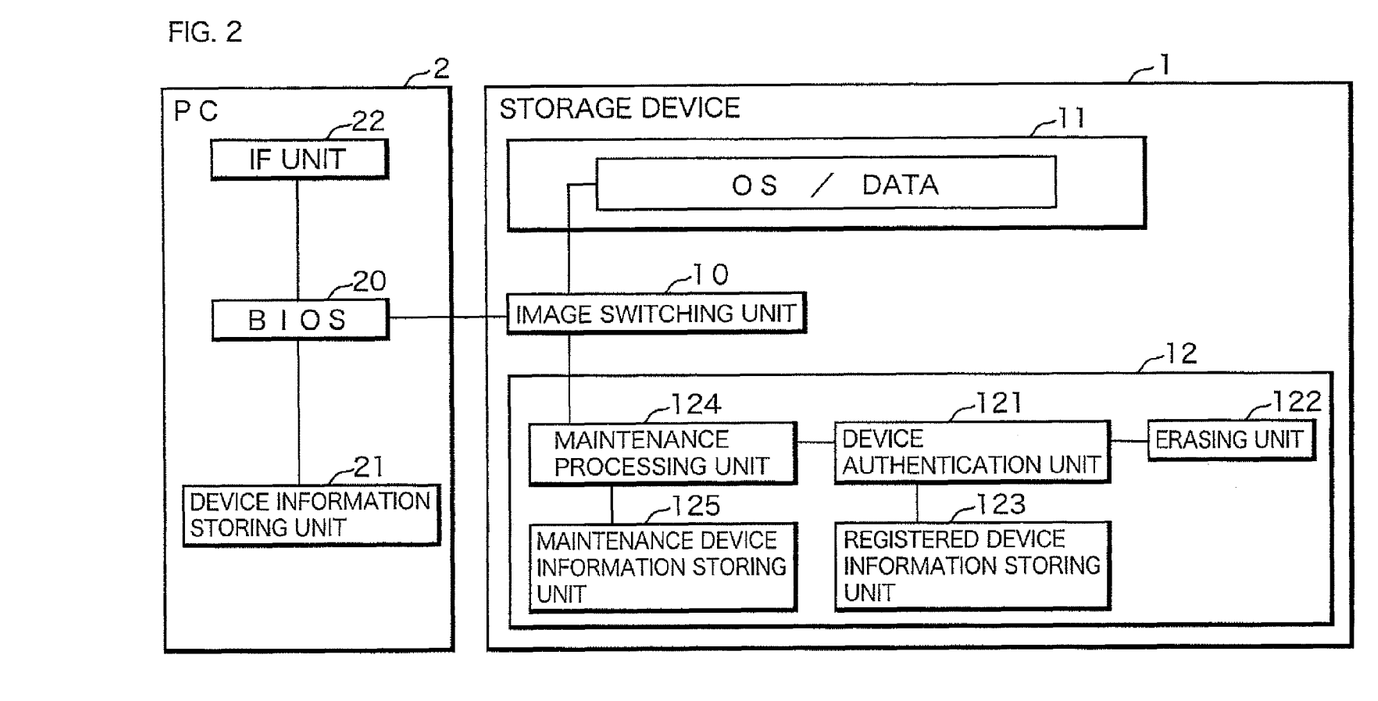
FIG. 2 is a schematic view explaining a functional structure of the storage device.

FIG. 2 is a schematic view explaining the functional structure of the storage device 1. FIG. 2 also illustrates the schematic structure of the PC 2 as the connection destination for the explanation. The PC 2 is, e.g., a personal computer, and includes a CPU, a ROM, a RAM and the like. A device information storing unit 21 of the PC 2 stores information that uniquely identifies the PC 2 (device information). For example, it is possible to use a unique information of 18 digits (FMVAB1Z300R1234567 or the like) obtained by combining the model name and the production number of the PC 2.

In the present embodiment, although the device information is stored in the device information storing unit 21, the device information may also be stored in a NVRAM of a BIOS 20.

The storage device 1 is capable of acquiring the device information via the BIOS 20 of the PC 2. It may be considered that the method for acquiring the device information differs according to a model or a manufacturer. In this case, the storage device 1 is not capable of registering another model or a PC manufactured by another manufacturer as a registered PC. However, the storage device 1 may recognize that the PC is different from the registered PC by not being able to acquire the device information, it is possible to execute the erasing of data in the data storage area 11.

The PBA area 12 of the storage device 1 includes a device authentication unit 121, an erasing unit 122, and a registered device information storing unit 123 that function by being run by the CPU of the PC 2 when the authentication of the HDD or the data erasing is performed, and a maintenance processing unit 124 and a maintenance device information storing unit 125 that function by being run by the CPU of the PC 2 at the time of the maintenance of the HDD.

The device authentication unit 121 compares the device information of the PC 2 to which the device (storage device 1) is connected with a device information retained in the registered device information storing unit 123 to perform authentication. When the device authentication unit 121 authenticates the connected PC 2, the device authentication unit 121 grants access authority to the data storage area 11 to the image switching unit 10, and causes the image switching unit 10 to load the OS image in the data storage area 11. When the device authentication unit 121 does not authenticate the connected PC 2, the device authentication unit 121 instructs the erasing unit 122 to erase data stored in the data storage area 11.

In addition, when there is no device information registered in the registered device information storing unit 123, the registered device information storing unit 123 acquires the device information of the PC 2 to which the device (storage device 1) is connected, and registers the acquired device information.

The erasing unit 122 receives the instruction of the device authentication unit 121 to erase data in the data storage area 11. In the present embodiment, the data erasing is performed by resetting an encryption key with which data is encrypted.

In the registered device information storing unit 123, the device information acquired from the PC 2 to which the device (storage device 1) is connected is registered at the time of initial registration. In addition, it is also possible to register the device information by providing an application for registering the device information (registration application) in the PBA area 12 or on the OS. For example, there may be considered a method in which a registration application that displays a menu screen in the PC 2 when a specific operation is performed at a certain timing is provided in the PBA area 12 in advance, and the device information is registered from the menu screen.

In the present embodiment, the registered device information storing unit 123 is assumed to be capable of registration of a plurality of devices. It is assumed that the first device to be registered is automatically registered by an initial setting, and the second and subsequent devices are additionally registered by a user using the registration application in the PBA area 12 or on the OS.

The maintenance processing unit 124 compares the device information of the PC 2 to which the device (storage device 1) is connected with a device information retained in the maintenance device information storing unit 125, and executes maintenance processing when the device information match with each other. In the maintenance processing, the device information stored in the registered device information storing unit 123 and the maintenance device information storing unit 125 are cleared. By clearing the registered device information storing unit 123, it becomes possible to re-register the device. When the device information do not match with each other, the device information stored in the maintenance device information storing unit 125 is cleared, and the processing is shifted to the device authentication unit 121. When the device information is not retained in the maintenance device information storing unit 125, the processing is shifted to the device authentication unit 121 without carrying out any operation.

In the maintenance device information storing unit 125, the device information of a PC for maintenance (PC 2) is registered. The reason why the device information retained therein is cleared every time the maintenance processing is performed is to prevent the avoidance of execution of the HDD erasing on boot-up by registering the PC for maintenance.

Figure 3:
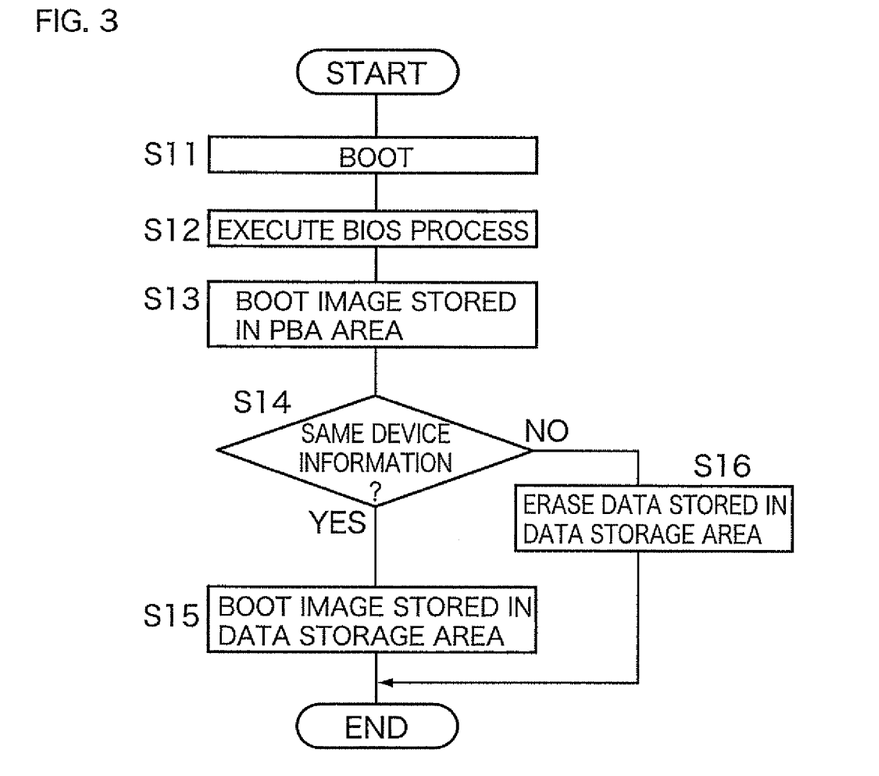
FIG. 3 is a flowchart illustrating a processing procedure on boot-up.

FIG. 3 is a flowchart illustrating a processing procedure on boot-up. When the PC 2 is booted (at S11), the PC 2 executes processing of the BIOS 20 (at S12). When the storage device 1 in conformity with the TCG Opal SSC specifications is connected to the PC 2, the PC 2 loads the image in the PBA area 12 into a storage of the PC 2 such as the RAM or the like, and runs the image by the CPU of the PC 2 (at S13). The image in the PBA area 12 is loaded and run by the CPU of the PC 2, whereby the device authentication unit 121, the erasing unit 122, and the maintenance processing unit 124 function in the PC 2.

The device authentication unit 121 acquires the device information from the PC 2 to which the device (storage device 1) is connected, and compares the device information with the device information retained in the registered device information storing unit 123 to determine whether or not the device information match with each other, whereby the device authentication unit 121 performs device authentication (at S14).

When the device information match with each other (S14: YES), an authority grant signal for granting the access authority to the data storage area 11 to the image switching unit 10 is transmitted from the PC 2 to the device (storage device 1), and the image in the data storage area 11 is activated (at S15). That is, the image in the data storage area 11 is loaded into the storage of the PC 2 such as the RAM or the like, and the image is run by the CPU of the PC 2.

When the device information do not match with each other (S14: NO), the device authentication unit 121 instructs the erasing unit 122 to erase data in the data storage area 11, and the erasing unit 122 resets the encryption key to erase data stored in the data storage area 11 (at S16).

With these operations, even when trying to detach the storage device 1 connected to the authorized PC 2 and obtain data therein by connecting the storage device 1 to another PC, the data in the data storage area 11 is erased at the point when the PC is booted so that the leakage of secret information may be prevented.

Figure 4:
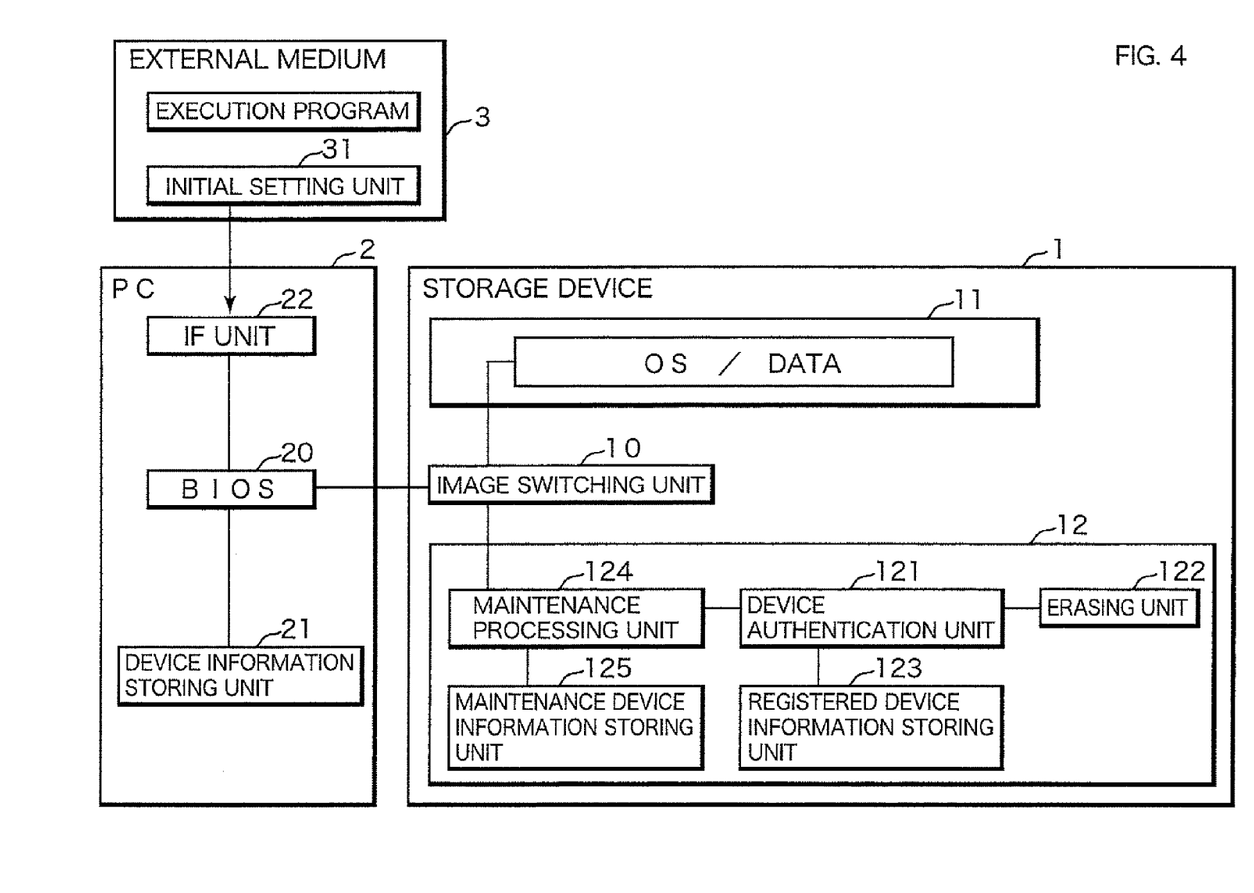
FIG. 4 is a schematic view illustrating a structure at the time of an initial setting.

Next, a description will be given of a procedure when the authentication function and the erasing function according to the present embodiment are set in the TCG-HDD. FIG. 4 is a schematic view illustrating the structure at the time of an initial setting. In order to set the authentication function and the erasing function in the TCG-HDD, it is preferable to set execution programs for implementing the above-described device authentication unit 121, erasing unit 122, and maintenance processing unit 124, and storage areas for the registered device information storing unit 123 and the maintenance device information storing unit 125 in the PBA area 12.

Since there is a possibility that such initial setting is made by a manufacturing plant or a user, as a method that allows the manufacturing plant and the user to easily make the initial setting, a structure is adopted in which an external medium 3 such as a CD-ROM, a USB memory or the like includes an initial setting unit 31 and execution programs to be installed.

The above-mentioned execution programs stored in the external medium 3 are captured into the PBA area 12 of the storage device 1 via an IF unit 22 of the PC 2.

Since the registered device information is set in the initial setting processing, when the setting is completed, it is preferable to avoid the execution of an unnecessary initial setting. For example, there may be considered a method in which it is determined whether or not the programs are already installed in the PBA area 12 at the beginning of the processing by the initial setting unit 31, and the initial setting processing is stopped when the programs are already set, or the like.

Further, in the method utilizing the PBA area 12, a structure may also be adopted in which an initial setting program is stored in the PBA area 12, the initial setting program downloads the execution programs from the external medium 3 at the first boot-up, and the initial setting program is erased at a stage where various settings are completed.

Figure 5:
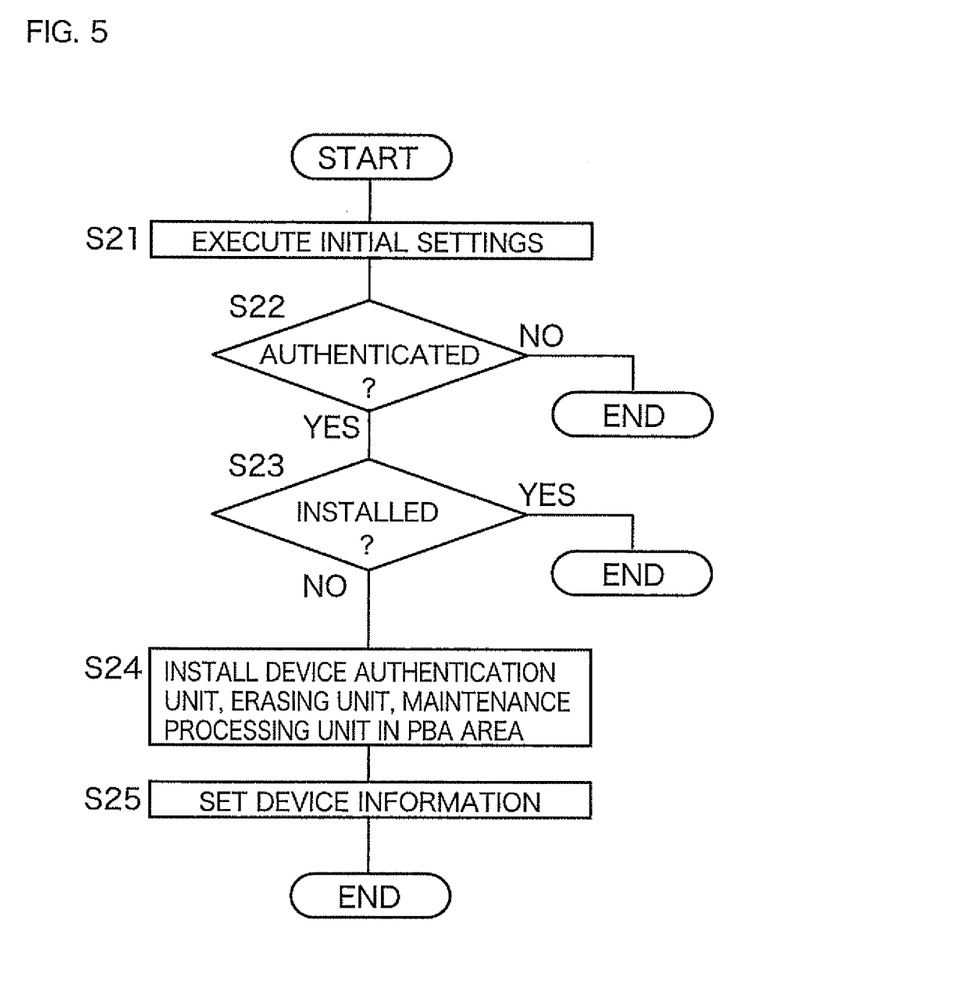
FIG. 5 is a flowchart illustrating a procedure for the initial setting.

FIG. 5 is a flowchart illustrating a procedure for the initial setting. The flowchart illustrated in FIG. 5 illustrates a procedure when the initial setting is performed by a user. This initial setting is performed during boot-up of the OS. First, during boot-up of the OS, the external medium 3 such as the CD-ROM, the USB memory or the like is connected to the IF unit 22 of the PC 2, and the initial setting processing by the initial setting unit 31 is executed (at S21). The initial setting unit 31 may be automatically run when the external medium 3 is inserted into a drive.

The initial setting unit 31 firstly performs authentication (at S22). In the authentication, it is possible to use user authentication, and device authentication. For example, by requiring password input, it is possible to allow only an authorized user to execute the initial setting. In addition, it is also possible to perform authentication in which manufacturer information of a device is acquired from the BIOS 20 in advance, and the initial setting is terminated when the device is a PC manufactured by the other manufacturers, or the manufacturer information is not obtained. The manufacturer information is retained in the NVRAM of the BIOS 20 similarly to a model number and the like.

When the authentication is successful (S22: YES), the initial setting unit 31 determines whether or not the execution programs are already installed in the PBA area 12 (at S23). When the authentication is unsuccessful in the at S22 (S22: NO), or when the execution programs are installed in the PBA area 12 (S23: YES), the processing according to the present flowchart is terminated.

When the authentication is successful (S22: YES) and it is determined that the execution programs are not installed in the PBA area 12 (S23: NO), the initial setting unit 31 starts the initial setting.

The initial setting unit 31 firstly installs the respective execution programs of the device authentication unit 121, the erasing unit 122, and the maintenance processing unit 124 in the PBA area 12 (at S24). After the installation of the execution programs, the initial setting unit 31 secures areas for the registered device information storing unit 123 and the maintenance device information storing unit 125, and sets the device information of the PC 2 to which the device (storage device 1) is currently connected in the registered device information storing unit 123 (at S25).

The above-described operations complete the initial setting. On the next or subsequent boot-up, when the storage device 1 is connected to a PC other than the registered PC 2, and the PC is booted, data stored in the data storage area 11 of the storage device 1 is erased.

Figure 6:
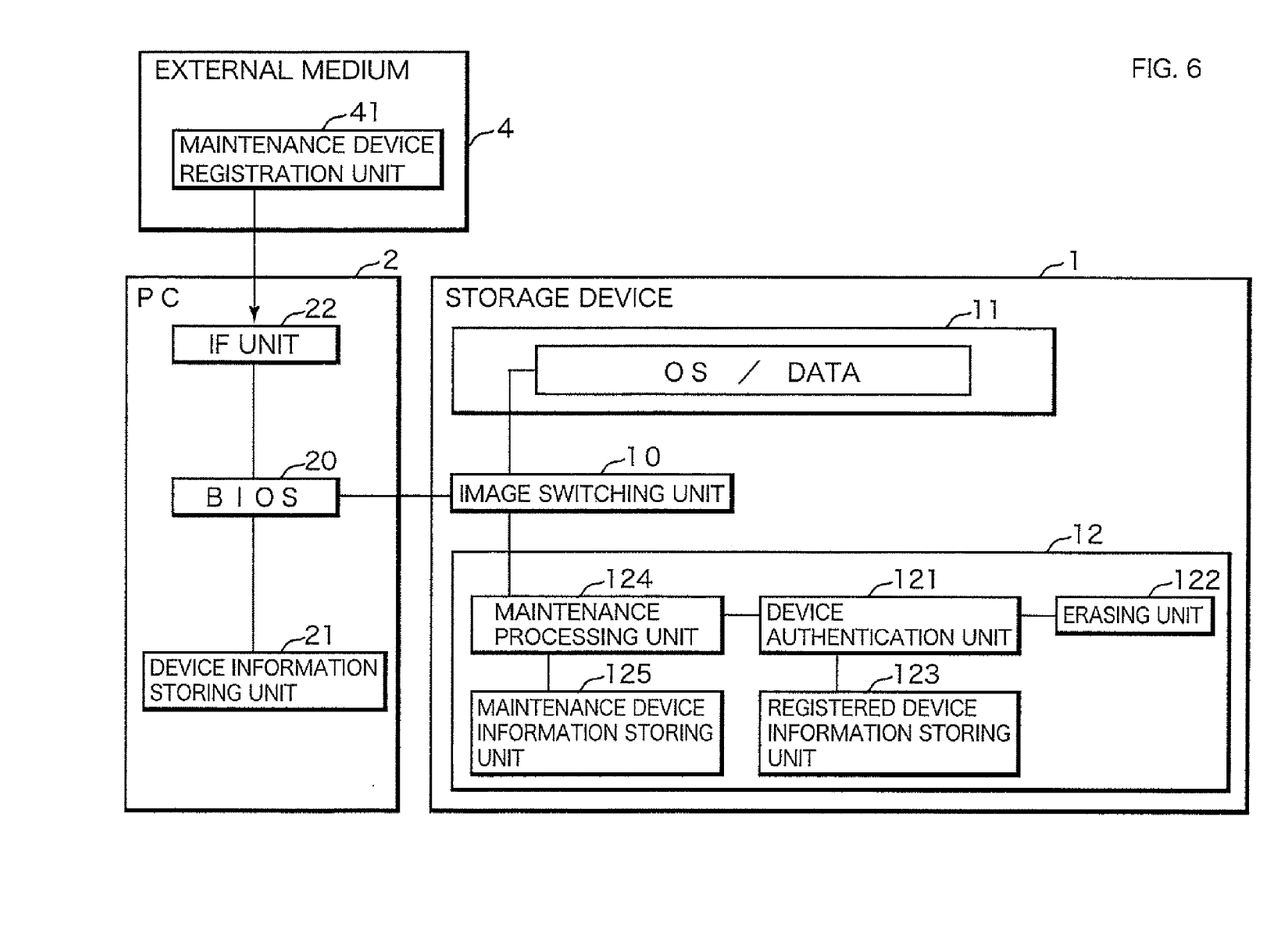
FIG. 6 is a schematic view illustrating a structure at the time of maintenance processing.

Next, the maintenance processing will be described. FIG. 6 is a schematic view illustrating the structure at the time of the maintenance processing. Similarly to the initial setting, a structure is adopted in which the maintenance processing is executed by using an external medium 4. A maintenance device registration unit 41 is contained in the external medium 4 that may be activated from the BIOS 20 of the PC 2, and the PC 2 is registered as a device for maintenance in the storage device 1 only when the BIOS 20 activates the external medium 4.

In the present embodiment, although a structure is adopted in which the maintenance device registration unit 41 is contained in the external medium 4, a structure may also be adopted in which the maintenance device registration unit 41 is contained in the PC 2, the PBA area 12 of the storage device 1, a server on a network, or the like.

In addition, in the storage device 1 including the self-erasing function as described in the present embodiment, since data in the data storage area 11 is erased when a maintenance operation fails, it is desirable that the maintenance processing without any operational mistake may be executed. When the maintenance device registration unit 41 is contained in the PC 2 or the storage device 1, it is preferable for a person in charge of the maintenance to perform an operation for reporting a timing for the maintenance at a specific timing. Accordingly, there is a possibility that mistakes are made due to the intervention of manual work by the person.

When the maintenance device registration unit 41 is contained in the server on the network, the maintenance processing is possible only in an environment that allows connection to the network.

When the external medium 4 is utilized, the maintenance processing is executed at a timing at which the external medium 4 is connected to the PC 2. In particular, in a setting of a device startup sequence in the BIOS 20, the external medium 4 such as the CD-ROM, the USB memory or the like is prioritized over the HDD, whereby the maintenance processing may be reliably started only by connecting the external medium 4 and booting the PC 2.

However, when the external medium 4 is prioritized to be activated without limitation, there is a possibility that the operation becomes a method for avoiding the erasing of the HDD. Consequently, it is preferable to include some limitation that prevents the activation of the external medium 4 for the maintenance. For example, similarly to the initial setting, it is preferable to screen a device capable of using the external medium 4 by acquiring the manufacturer information from the PC 2 to allow the maintenance only with a device manufactured by a specific manufacturer, acquiring the model number of the device to allow the maintenance only when the model numbers match with each other, or the like. In addition, there may be considered a method in which a different password is set for each external medium 4 and the password may be required before the maintenance processing is executed. With this method, it becomes possible to screen a user capable of using the external medium 4.

Figure 7:
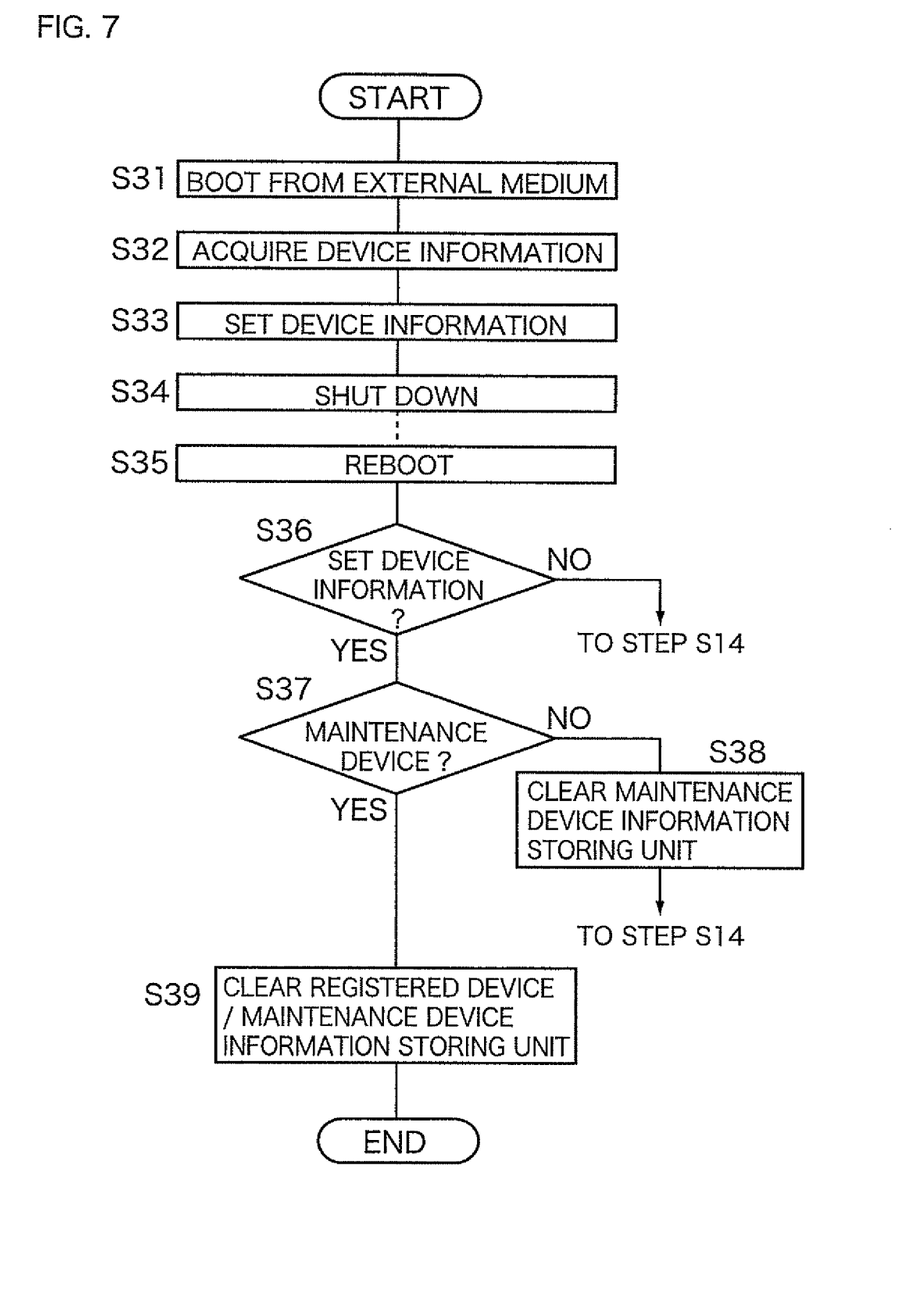
FIG. 7 is a flowchart explaining a procedure for the maintenance processing.

FIG. 7 is a flowchart explaining the procedure for the maintenance processing. First, the PC 2 is booted from the external medium 4 (at S31), and the device information of the PC 2 is acquired (at S32). Next, the maintenance device registration unit 41 of the external medium 4 sets the acquired device information of the PC 2 in the maintenance device information storing unit 125 provided in the PBA area 12 of the storage device 1 (at S33). With the above-described steps, the device information of the device for maintenance is registered in the storage device 1. When the device information is registered, the PC 2 is temporarily shut down (at S34). The shutdown may be automatically performed by the maintenance device registration unit 41, or may be manually performed by a user.

When the PC 2 is rebooted (at S35), the maintenance processing unit 124 determines whether or not the device information is set in the maintenance device information storing unit 125 (at S36). When the device information is not set in the maintenance device information storing unit 125 (S36: NO), the processing in and after the at S14 is executed according to the same procedure as that in the flowchart illustrated in FIG. 3.

When the device information is set in the maintenance device information storing unit 125 (S36: YES), the device information set in the maintenance device information storing unit 125 is compared with the device information acquired from the currently connected device, and it is thereby determined whether or not the currently connected device is the device for maintenance (at S37).

When it is determined that the currently connected device is not the device for maintenance (S37: NO), the maintenance device information storing unit 125 is cleared (at S38), and the processing in and after the at S14 is then executed.

On the other hand, when it is determined that the currently connected device is the device for maintenance (S37: YES), both of the registered device information storing unit 123 and the maintenance device information storing unit 125 are cleared (at S39).

In the maintenance processing, when home-visit repair service by a serviceman is assumed, e.g., in a case where a motherboard of the PC 2 is replaced with new one, a device information of the new motherboard is not registered in the registered device information storing unit 123 in the storage device 1 so that data in the data storage area 11 is erased. That is, when the registered PC 2 breaks down, it is not possible to use the storage device 1 in other PCs. Consequently, by executing the maintenance processing of which the procedure is illustrated in FIG. 7, it is possible to continuously use the storage device 1 in other PCs.

Second Embodiment

In the first embodiment, although the structure is adopted in which the execution programs for implementing the device authentication unit, the erasing unit, and the maintenance processing unit are installed in the PBA area 12 of the storage device 1 by utilizing the external storage medium 3, a structure may also be adopted in which these execution programs are downloaded from a server connected to a network.

In the second embodiment, a description will be given of a structure in which the execution programs are downloaded from the server to perform the initial setting.

Figure 8:
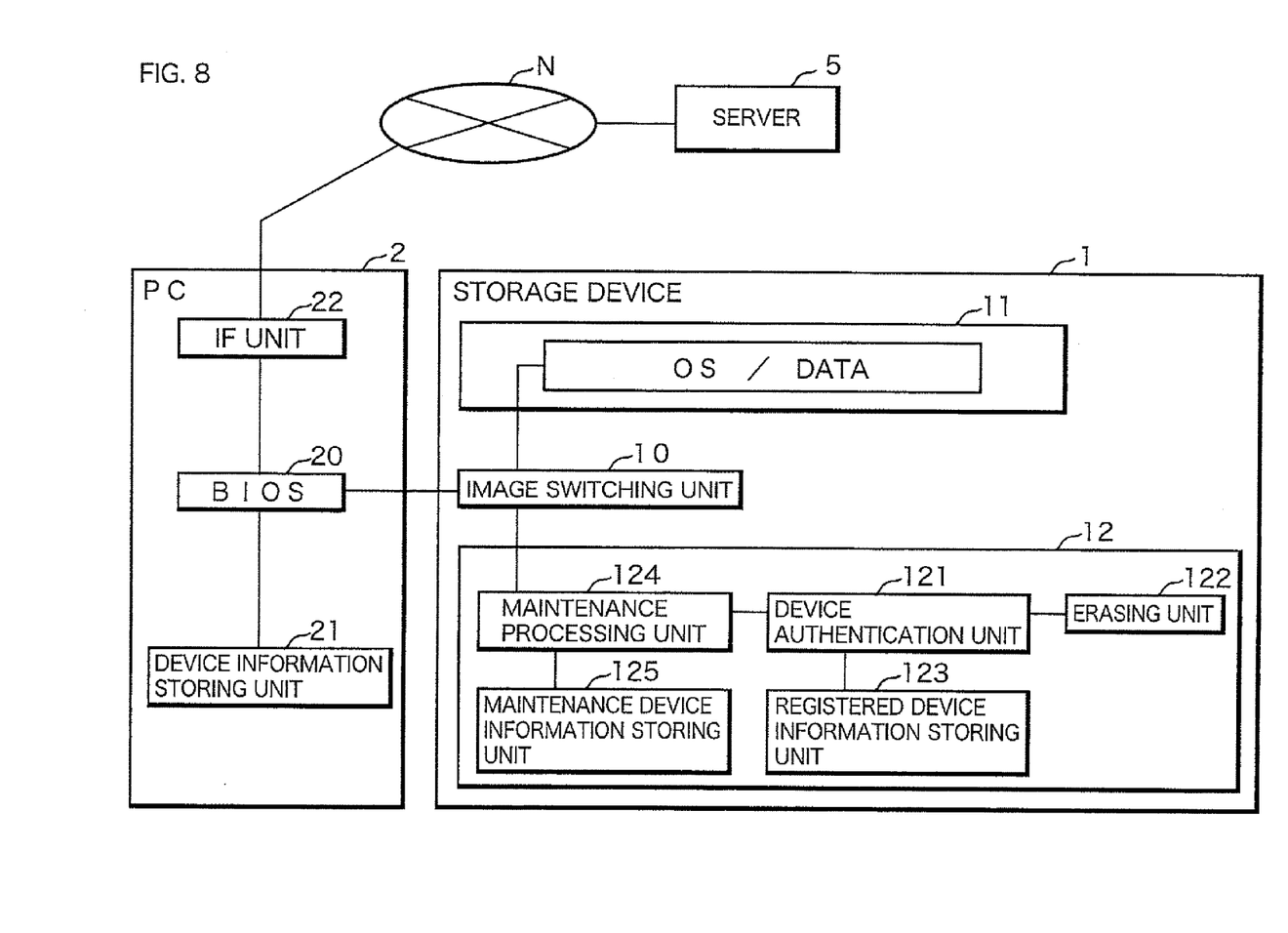
FIG. 8 is a schematic view illustrating a device structure of a second embodiment.

FIG. 8 is a schematic view illustrating a device structure of the second embodiment. The structures of the storage device 1 and the PC 2 are exactly the same as those described in the first embodiment. The IF unit 22 of the PC 2 is connected to a server 50 via a communication network N.

As described in the first embodiment, it is preferable to set the execution programs for implementing the device authentication unit 121, the erasing unit 122, and the maintenance processing unit 124, and storage areas for the registered device information storing unit 123 and the maintenance device information storing unit 125 in the PBA area 12 of the storage device 1.

In the second embodiment, the execution programs for implementing the device authentication unit 121, the erasing unit 122, and the maintenance processing unit 124 are stored in the server 50.

The PC 2 acquires the above-described execution programs stored in the server 50 via the communication network N at a timing at which the initial setting is performed, and installs the execution programs in the PBA area 12 of the storage device 1. The procedure for the installation is exactly the same as the procedure described in FIG. 5 of the first embodiment.

In the present embodiment, although the connection to the communication network N may be required at the time of the initial setting, the present embodiment includes an advantage that, even when the TCG-HDDs are collectively introduced in units of several hundreds, or several thousands, the introduction thereof is facilitated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification related to a showing of the superiority and inferiority of the invention. Although the embodiments of the present inventions have been described in detail, it should be understood that the various changes, substitutions, and alternations could be made hereto without departing from the spirit and scope of the invention.

What is claimed is:

1. A data processing device comprising:
a connection part to which a storage device including a first storage area storing data and a second storage area storing a program implementing a preboot authentication function;
a determination unit which determines whether or not the storage device is connected to the connection part and the program is stored in the second storage area of the storage device, during boot-up of the data processing device; and
a registration unit which registers the program and an identification information of the data processing device in the second storage area when it is determined that the program is not stored in the second storage area of the storage device connected to the connection part,
wherein an identification information of a device for maintenance may be registered in the second storage area, and when the identification information of the data processing device and the identification information of the device for maintenance stored in the second storage area match with each other, the identification information of the data processing device and the device for maintenance registered in the second storage area are erased.

2. The data processing device according to claim 1, wherein the storage device is a storage device in conformity with an Opal SSC (Opal Security Subsystem Class) specification.

3. The data processing device according to claim 1, wherein the storage device executes the program to perform authentication of a connection destination using the preboot authentication function when it is determined that the program is stored in the second storage area of the storage device connected to the connection part.

4. The data processing device according to claim 3, wherein data stored in the first storage area is erased when the authentication using the preboot authentication function is unsuccessful, and
a storage area to be used is switched from the second storage area to the first storage area when the authentication using the preboot authentication function is successful.

5. The data processing device according to claim 1, wherein an identification information of a device for maintenance may be registered in the second storage area, and
when the identification information of the data processing device and the identification information of the device for maintenance stored in the second storage area do not match with each other, the identification information of the device for maintenance registered in the second storage area is erased, and authentication using the preboot authentication function is performed.

6. A registration method comprising:
connecting a storage device which includes a first storage area storing data and a second storage area storing a program implementing a preboot authentication function to a connection part of a data processing device;
determining whether or not the program is stored in the second storage area of the storage device during boot-up of the data processing device; and
registering the program and an identification information of the data processing device in the second area when it is determined that the program is not stored in the second storage area of the connected storage device,
wherein an identification information of a device for maintenance may be registered in the second storage area, and when the identification information of the data processing device and the identification information of the device for maintenance stored in the second storage area match with each other, the identification information of the data processing device and the device for maintenance registered in the second storage area are erased.

7. A non-transitory recording medium storing a computer program, comprising:
causing a computer, to which a storage device including a first storage area storing data and a second storage area storing a program implementing a preboot authentication function is connected, to determine whether or not the program is stored in the second storage area of the storage device during boot-up of the computer; and
causing the computer to register the program and an identification information of the computer in the second storage area when it is determined that the program is not stored in the second storage area of the connected storage device,
wherein an identification information of a device for maintenance may be registered in the second storage area, and when the identification information of the computer and the identification information of the device for maintenance stored in the second storage area match with each other, the identification information of the computer and the device for maintenance registered in the second storage area are erased.

* * * * *